United States Patent [19]

Patterson

[11] Patent Number: 5,580,838
[45] Date of Patent: *Dec. 3, 1996

[54] UNIFORMLY PLATED MICROSPHERE CATALYST

[76] Inventor: James A. Patterson, 2074 20th St., Sarasota, Fla. 34236

[*] Notice: The term of this patent shall not extend beyond the expiration date of Pat. No. 5,318,675.

[21] Appl. No.: 462,005

[22] Filed: Jun. 5, 1995

[51] Int. Cl.⁶ .................................. B01J 35/08; C25B 1/00
[52] U.S. Cl. ........................... 502/159; 502/10; 204/222; 204/290 R; 427/125
[58] Field of Search ................. 204/222, 290 R; 502/10, 20, 159, 101; 427/125, 126.5, 255.4, 383.5

[56] References Cited

U.S. PATENT DOCUMENTS

| | | |
|---|---|---|
| 2,915,406 | 12/1959 | Rhoda et al. |
| 3,577,324 | 5/1971 | Patterson. |
| 3,763,002 | 10/1973 | Skomoroski et al. ............... 204/37 |
| 3,787,718 | 1/1974 | Patterson. |
| 3,965,039 | 6/1976 | Chaplits et al. |
| 3,991,225 | 11/1976 | Blouin. |
| 4,130,506 | 12/1978 | Collier. |
| 4,179,402 | 12/1979 | Kim et al. |
| 4,243,728 | 1/1981 | Sato et al. |
| 4,306,085 | 12/1981 | Kim et al. |
| 4,586,998 | 6/1986 | Wood .................................. 204/252 |
| 4,587,001 | 5/1986 | Carins et al. ........................ 204/290 |
| 4,853,135 | 9/1989 | Oeckl et al. |
| 5,036,031 | 7/1991 | Patterson. |
| 5,318,675 | 6/1994 | Patterson ............................. 204/86 |
| 5,372,688 | 12/1994 | Patterson. |
| 5,494,559 | 2/1996 | Patterson ............................ 204/222 |

FOREIGN PATENT DOCUMENTS

| | | | |
|---|---|---|---|
| 0125286 | 9/1980 | Japan | 204/290 R |
| 0114678 | 7/1982 | Japan | 204/290 R |

*Primary Examiner*—Glenn A. Caldarola
*Attorney, Agent, or Firm*—Charles J. Prescott

[57] ABSTRACT

Cross-linked polymer microspheres having a sulfonated cation exchange surface are carefully separated into fractions of equal size and density. Each fraction is separately plated preferably with copper, palladium, nickel, titanium or any metal cation which will reduce with hydrazene to form a conductive metal flash coating. The flash coat plated microspheres are again separated into fractions of equal size and density. Each fraction is then given additional metal platings first of nickel, then preferably palladium, then a support plate for the palladium, followed preferably by a stabilizing metal plate such as chromium. The thus plated microspheres have uniformly thick platings and have a maximized surface area for the amount of metal plated making them particularly useful as catalysts or in electrical products or processes. Microspheres having a plating of palladium exhibit a marked improvement in the adsorption of hydrogen both quantitatively and in rapidity. An inner nickel plating between the copper flash coat and palladium plate and an outer nickel plating atop the palladium plate serve to structurally stabilize the palladium plate during a heat production duty cycle without inhibiting hydrogen adsorption by the palladium plate.

25 Claims, 1 Drawing Sheet

UNIFORMLY PLATED MICROSPHERE CATALYST

BACKGROUND OF THE INVENTION

1. Scope of Invention

This invention relates generally to metal plating and more particularly to improved uniform plated microspheres for use in catalytic processes and electrical applications.

2. Prior Art

In U.S. Pat. No. 3,577,324, I described a process and apparatus for plating particles which had as a preferred embodiment the plating of polymeric beads formed from polystyrene cross-linked with divinyl benzene. A solution for bonding copper atoms to such beads was disclosed.

In U.S. Pat. No. 3,787,718, I disclosed the use of plated spherical particles as electronic components. In this patent, the forming of additional coatings or platings on the copper layer was also disclosed.

U.S. Pat. No. 2,915,406 to Rhoda et al., entitled "Palladium Plating by Chemical Reduction", discloses a number of baths for use in immersion plating of various metals.

Another of my earlier patents, U.S. Pat. No. 5,036,031, teaches a metal plated microsphere catalyst, the disclosure of which is incorporated herein by reference. This prior patent teaches the application of a copper plate of uniform thickness atop which a palladium plate is applied, the copper plate being applied atop microspheres formed of cross-linked polystyrene similar to my '324 patent.

In utilizing the microsphere catalyst disclosed in my '031 patent in the cell disclosed in my prior U.S. Pat. No. 5,372,688, I have observed a black residue forming within the liquid electrolyte of this cell. I have also observed shorter than expected cell life. Upon further investigation, I have determined that the source of the black residue is palladium which has been separated from the microsphere catalyst beads under heat and electrical current duty cycle.

The present invention discloses the preparation of copolymer microspheres having copper salts on the outer portion. These microspheres are separated into batches of substantially uniform sizes and are then plated. By plating microspheres of the same size and density (as determined by Stoke's Law), a plating of uniform thickness can be achieved. This uniformly thick plating is essential when the plated microspheres are used in catalytic beds and/or with electric current flowing. Non-uniformly thick platings will result in hot spots which will cause the plating to spall off. An improved plated layer combination including a layer of nickel atop palladium is also disclosed which serves to structurally stabilize the palladium plate without inhibiting diffusion of hydrogen to palladium.

BRIEF SUMMARY OF THE INVENTION

As disclosed in U.S. Pat. No. 5,036,031 and 4,943,355, in a column exchange, a copolymer in hydrogen form is reacted with chlorosulfonic acid, the resulting microspheres have a sulfonate surface in the hydrogen form. The microspheres are washed with deionized water. The sulfonated microspheres are next placed in an aqueous copper chloride solution. The microspheres have copper salts on the surface and hydrochloric acid is contained in the solution by ion exchange. The microspheres are again washed with deionized water. The resulting copolymer when dried is in the form of microspheres having copper salts on the exterior. These microspheres are separated by passing them through meshes of progressively decreasing size beginning with U.S. sieve cut 16–18 and ending with U.S. sieve cut 25–30. Each such separated group of microspheres is further hydraulically separated to obtain microspheres of sizes identical to ±0.005 g/cm$^3$.

These microspheres are then plated with the electroless copper plating solution described in U.S. Pat. No. 3,577,324 with the required good agitation or with a flash coating formed of a metal cation which will chemically reduce with hydrogen or hydrazine such as copper, nickel, palladium or titanium. After drying and further sorting, these microspheres are given an additional metal plating using the apparatus disclosed in the previously mentioned '324 patent and solutions which will be described herein for various metal platings. Such plated microspheres are useful in electrical applications and in catalytic processes. For example, microspheres having a palladium outer plate have been found to occlude hydrogen in increased quantities and at faster rates than pure palladium wire or palladium plated wire. A further improvement includes applying an additional nickel outer plate atop the palladium plate and thereunder atop the copper plate or flash coat to add structural integrity to the palladium plate.

It is therefore an object of this invention to provide improved catalytic microspheres which have plating layers of uniform thickness atop uniform nonmetallic beads which layers include various combinations of an inner nickel plate and a palladium or similar plate thereatop and another plated layer for added strength atop the palladium plate when the microspheres are used during hydrogen (or an isotope of hydrogen) cycling in catalytic reactions.

In accordance with these and other objects which will become apparent hereinafter, the instant invention will now be described with reference to the accompanying drawings.

DETAILED DESCRIPTION OF THE INVENTION

My prior U.S. Pat. No. 5,036,031 (U.S. '031) is incorporated in its entirety herein by reference.

Figure 1:
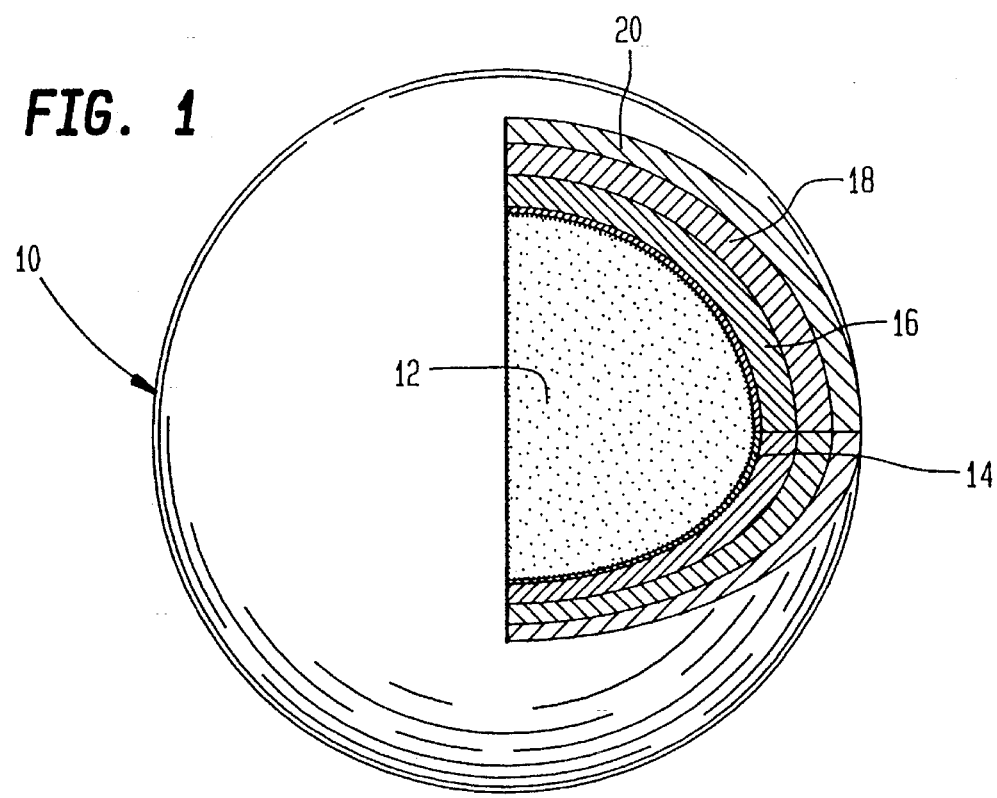
FIG. 1 depicts in broken perspective one embodiment of the invention.
Figure 2:
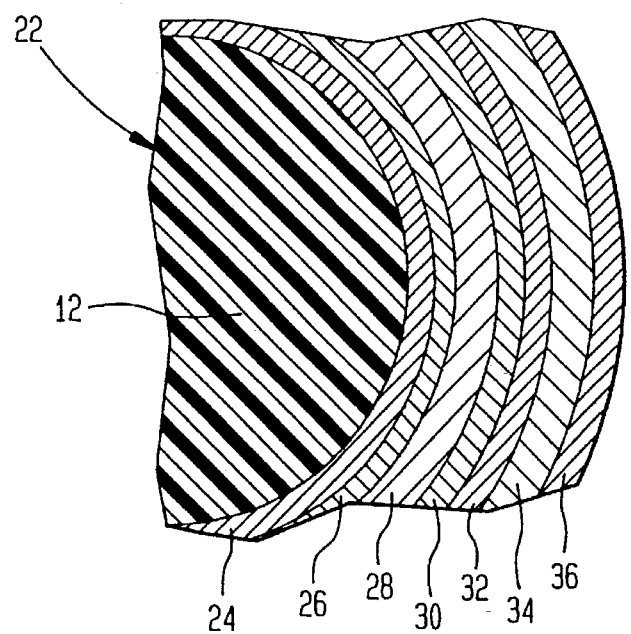
FIG. 2 is a broken section view of another embodiment of the invention.

Cross-linked polystyrene copolymer is reacted in a column exchange with chlorosulfonic acid yielding sulfonated cross-linked polystyrene copolymer microspheres having hydrogen ions on the outer layer and hydrochloric acid, as shown in FIG. 1 of my U.S. '031. This sulfonation should be limited to a 100 molecular layer depth. If sulfonation is excessive, the diameter of the microspheres will change when dry microspheres are hydrated. Following this reaction, the sulfonated polystyrene microspheres are washed with deionized water. Next, aqueous copper chloride is added to the solution and substitutes for the hydrogen ions in the outer layer, as shown in FIG. 2 of U.S. '031. The microspheres are again washed with deionized water and dried. The resulting microspheres have copper salts on the exterior. The microspheres are passed through sieves to separate them into batches with each batch containing microspheres of substantially the same size. The largest cut is U.S. sieve 16–18 followed by 18–20, 20–25 and 25–30 mesh. Each cut is then individually hydraulically separated in a cone having an upwardly laminar water flow. As is well known, in accordance with Stoke's Law, microspheres of different densities and size will be found in different layers or zones. The microspheres in each zone are carefully removed separately and are now in fractions which are identical to ±0.005 grams/cm$^3$. These fractions are then copper coated using the process disclosed in U.S. Pat. No. 3,577,324. The resulting copper coated microspheres perform superiorly as electronic components and in catalytic functions because they do not develop hot spots as occurred with microspheres formed by the previous process. Such hot spots would cause the metal coating to pop off the microspheres.

For many applications, a second metal coating is desired. To assure uniformity of coating, the copper coated microspheres are again hydraulically separated to an accuracy of ±0.0075 grams/cm$^3$.

Second metal platings of various metals atop the copper coat have been performed using the apparatus disclosed in U.S. Pat. No. 3,577,324 and the solutions are described in U.S. '031 wherein the following are described in detail:

By Electroplating:
 Gold plating;
 Silver plating;
 Platinum plating;
 Palladium plating;
 Nickel plating;
By Immersion plating:
 Palladium plating;
 Nickel plating;
 Rhodium plating atop copper plate;
 Tin plating atop copper plate;
 Gold plating atop copper plate;
 Silver plating atop copper plate;
 Platinum plating atop copper plate.
By Electroless plating:
 Copper plating;
 Nickel plating;
 Palladium plating.

In addition to the above processes for forming the desired plated layers, the microplating processes for applying these plates may include the methods of vacuum evaporation, ion plating, and sputtering. These additional plating processes are fully described in "Vacuum Metalizing" by Paul R. Forant, *Metal Finishing Guide Book and Directory* (Issue '84) at pages 365 to 375.

CATALYTIC SUPPORTED METALS

Only thin metal films ar required for catalytic activity. One of the active metal groups for producing surface catalytic reactions is nickel (58.69), palladium (106.70), white gold (197.20), platinum (185.23), titanium (47.9) with specific gravities of 8.9, 12,02, 21.45, 4.5 g/cm$^3$, respectively. For example, palladium (Pd) surface will adsorb hydrogen gas. This adsorption will be used as an example to show an improvement in surface activity of metals coated on small stable copolymer microspheres.

Palladium coated microspheres are preferred for hydrogen (or an isotope of hydrogen) adsorption. However, palladium may be substituted by other transition metals, rare earths and also uranium. In general, any of these metals which are capable of combining with high volumes of hydrogen to form "metallic hydrides" are acceptable. These metals known to applicant which will serve as a substitute for, or in conjunction with, palladium are lanthanum, praseodymium, cerium, titanium, zirconium, vanadium, tantalum, uranium, hafnium and thorium. Authority for the inclusion of these elements within this group is found in a book entitled *"Inorganic Hydrides"* by B. L. Shaw, published by Pergamon Press, 1967. However, palladium is the best known and most widely studied metallic hydride and isotopes and was utilized in my previously referenced patents to form conductive hydrogen-absorbing microspheres. In an even more general sense, the broad requirement here is to provide a "metallic hydride" (or isotopes thereof) surface, the makeup of the core of the microspheres being a secondary consideration.

PALLADIUM COATING OF PLASTIC SPHERES 100.000 grams of copolymer microspheres were treated as described to produce a flash copper coating. The copper coated microspheres when dry exhibit a static surface charge. Density of microspheres as determined by S.V.S., U.S. Pat. No. 4,196,618 was 1.0550 +/−0.0005 gm/cm$^3$ dry. A 0.1000 cm$^3$ tube was used in S.V.S. in conjunction with a Metler analytical balance. The microspheres were coated with palladium using three coating techniques, electroplating, immersion plating and electroless plating. In addition, coils of 100.000 gm, 0.05 mm diameter copper wire were coated using the same technique as the microspheres. All microspheres and wire were coated to give a weight of 20.000 grams of palladium.

| TABLE OF RESULTS PALLADIUM COATING | | |
|---|---|---|
| | BEADS | WIRE |
| WEIGHT | 100.00 grams | 100.00 grams |
| WEIGHT Pd | 20.00 grams | 20.00 grams |
| SPECIFIC GRAVITY OF Pd COATING IN GRAMS/CM$^3$ | | |
| PLATING | E | I | EL |
| | 11.00 | 11.40 | 11.1 |
| | 11.85 | 11.00 | 10.75 |
| | 12.00 | 11.95 | 11.85 |

E = ELECTRODEPOSITION
I = IMMERSION
EL = ELECTROLESS

HYDROGEN LOADING OF Pd SURFACES

As is well known, palladium is noted for its tendency to adsorb hydrogen and isotopes thereof. When finely divided, it takes up about 800 times its own volume. See Smith's College Chemistry by James Kendall, The Century Co., 1926, at page 630. Given below are comparative results of adsorption of hydrogen and isotopes thereof by palladium plated cross-linked polymer microspheres, palladium plated wire and pure palladium wire.

| VOLUMES OF HYDROGEN/VOLUME OF Pd | | | | | | | | |
|---|---|---|---|---|---|---|---|---|
| MICROSPHERES | | | Pd PLATED WIRE | | | PURE Pd WIRE | | |
| E | I | EL | E | I | EL | E | I | EL |
| 900 | 910 | 950 | 580 | 590 | 610 | | 570 | |
| 950 | 975 | 1050 | | | | | | |

1 volume Pd to x volumes hydrogen

Using specific gravity of Pd at 12.02 gm/cm$^3$ and coating weight for Pd volume and standard gas conditions for hydrogen, a volume of metal to volume of hydrogen is given as loading, i.e. where the Pd coating on the beads range from 1.962% to 1.760% of the microsphere volume. Microspheres range in size from 2 mm to 10 microns.

It is seen that the plated microspheres take up a larger volume of hydrogen per unit volume of Pd than either plated wire or pure Pd wire. This slows the improved catalytic nature of metal coated microspheres over plated or pure metal wire. The volume of metal on plated microspheres shows that considerably less metal is required on the microsphere to give improved reactions over the pure metal, using the palladium/hydrogen uptake as the example.

A remarkable result relating to the adsorption of hydrogen by palladium is depicted in FIG. 3 of U.S. '031. Palladium plated cross-linked polymer microspheres having an outside diameter of essentially 0.88 mm and palladium wire were exposed to hydrogen under standard conditions of temperature and pressure. In unit periods of time as shown in FIG. 3 of U.S. '031, the microspheres are found to reach maximum uptake in a much shorter period than the wire. It is believed that the adsorption occurs more rapidly on the surface and the beads present a much higher surface area. In addition, it appears that the thinner the metal plate on the beads, the more rapidly adsorption occurs, since the hydrogen does not have to penetrate deeply. Moreover, this thin coating does not adversely effect the electrical conduction properties when these microspheres are used as a catalyst in electrochemical or electro induced reactions. Consequently, the shell metal not only produces a greater product yield, but also produces it faster.

Based on the foregoing, the palladium coated microspheres represent an ideal adsorber for hydrogen and its isotopes. Other uses for the plated microspheres of the various metals described above will be apparent to those who typically use such metals as catalysts. The plated microspheres provide enhanced catalytic activity because the surface area is maximized for the weight and volume of the metal.

Referring now to FIG. 1 of the present application, the invention is shown generally at numeral 10. The core 12 is nonmetallic and preferably formed of cross-linked styrene divinyl-benzene as described in my previous '031 patent. It has been determined through experimentation that the addition of a nickel coating both beneath at 16 and atop at 20 the palladium coating 18 as above described affords still further hydrogen adsorbing catalytic results. In experiments utilizing the previously described palladium plated microspheres without nickel outer plating, these experimental results being disclosed in my earlier U.S. Pat. No. 5,318,675 and 5,372,688, a black residue developing within the liquid electrolyte was analyzed and determined to be palladium. This palladium had only one source, that being the palladium plate atop the '031 microsphere beads. Further analysis of the source of this black residue appears to be as a result of the heat/current duty cycle imposed upon the palladium plate of each microsphere as it is charged and the interacted with the electrolyte and electrical current within the cell described in my '688 and '675 patents. This duty cycle apparently results in minor cracking, flaking and/or spalling of the palladium plate.

The present invention as seen in FIG. 1 provides an additional inner nickel plating 16 applied atop the copper plate or flash coat 14 prior to the application of the palladium plate 18. Thereafter, an additional nickel plate 20 is applied atop the palladium 18, thus preparing the preferred embodiment 10 of this invention.

The primary benefit of the addition of the nickel plates 16 and 20 both beneath and atop the palladium plate 18 is to structurally stabilize the palladium while permitting free diffusion of hydrogen to the palladium plate 18. During the duty cycle described in the '688 and '675 patents, considerable heat is generated in the palladium layer causing expansion and contraction thereof. To prevent cracking, flaking and/or spalling of the palladium, the nickel layers both beneath and atop the palladium add structural integrity and prevent such damage or deterioration without inhibiting hydrogen diffusion.

The application of the nickel plating 16 atop the copper layer 14 is in accordance with the teachings of the techniques disclosed in my '355 patent. Thickness of this additional nickel layer 16 is in the range of about 10 angstroms to 1 micron in thickness as desired. Nickel plate thickness appears to be inversively proportional to the rate of hydrogen diffusion therethrough to the palladium layer.

The inner layer of nickel 16 also appears to provide a more uniform spherical foundation for the application of the palladium plate 18 thereatop and, in combination with the outer nickel plate 20, better supports the palladium layer 18 during heat cycling as previously discussed. It has also been determined by experimentation that this inner and outer combination of nickel layers 16 and 20 which straddles the palladium plating 18 stimulates heat production reaction.

A preferred layer thickness is in the range of 1 to 10 angstroms for the copper flash coat 14, in the range of 10 angstroms to 1 microns thickness for the inner nickel plate 16, in the range of about 10 angstroms to 2 microns for the palladium plate 18 and in the range of 10 angstroms to ½ micron for the outer nickel plate 20 atop the palladium plate 18.

Referring now to FIG. 2, another more general embodiment of the invention is shown generally at numeral 22 and includes the spherical nonmetallic core 12 as previously described with respect to FIG. 1. A flash coat 24 of a conductive metal coating of uniform thickness is formed of a metal cation which will chemically reduce with hydrogen. This flash coating 24 has a thickness in the range of from 1 to 10 angstroms. This flash coating 24 is taken from the group consisting of copper, palladium, nickel and titanium, copper being preferred.

A second layer 26 is then applied atop the flash coating 24 formed of nickel and having a uniform thickness in the range of 10 angstroms to 1 micron. A palladium layer 28 is then applied atop the nickel plating 26, the palladium plating 28 having a thickness in the range of 10 angstroms to 2 microns. More generally, this plate 28 may be formed of a metallic hydride which is readily combineable with hydrogen or an isotope of hydrogen as previously described. This metallic hydride plating 28 is taken from the group consisting of palladium, lanthanum, praseodymium, cerium, titanium, zirconium, vanadium, tantalum, uranium, hafnium and thorium, palladium, alone or in combination with any other in this group, being preferred.

A metallic support plating 30 of uniform thickness is then formed atop the metallic hydride forming plating 28, the metal chosen having a high hydrogen diffusion rate and a low hydride formation ratio. The materials which may be used to form this support plating 30 are taken from the group consisting of nickel, gold and silver, nickel being preferred. A high rate of hydrogen diffusion is considered to be in the range of about 0.85 mols hydrogen to 1 mol of palladium. A low hydride formation ratio is considered to be a molar ratio of metal to hydride or denteride of less than about 10:1, or 1 mol metal to less than 0.1 mol hydride or denteride.

A metallic stabilizer plating 32 of uniform thickness is then formed atop the support plating 30. The stabilizer plating 32 is formed of one of the transition metals capable of high rates of hydrogen diffusion and is taken from the group consisting of chromium, iron, cobalt, and nickel, chromium being preferred. Thicknesses are in the range of about 1 to 60 angstroms.

One or more pairs of additional layers 34/36 of palladium or more broadly a metallic hydride forming plating 34 followed by a nickel plating 36 or more broadly a metallic support plating having a high rate of hydrogen diffusion and a low hydride formation rate may be provided as desired for each particular catalytic environment. Multiples of these pairs of layers 34/36 may be built up one atop the other up to as many as five to ten pairs of additional layers for increased structural integrity and enhanced hydrogen adsorption.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A catalyst comprising:
   a plurality of conductive microspheres each having a first nickel layer of uniform thickness formed atop a copper layer of uniform thickness which is formed atop a non-conductive core;
   a palladium layer of uniform thickness formed atop said first nickel layer;
   said palladium layer having high hydrogen adsorption capabilities;
   a second nickel layer of uniform thickness formed atop said palladium layer.

2. A catalyst as set forth in claim 1, wherein:
   said non-conductive core is cross-linked polystyrene.

3. A catalyst as set forth in claim 1, wherein:
   at least one said layer is formed by electroplating.

4. A catalyst as set forth in claim 1, wherein:
   at least one said layer is formed by immersion plating.

5. A catalyst as set forth in claim 1, wherein:
   at least one said layer is formed by electroless plating.

6. A catalyst as set forth in claim 1, wherein:
   at least one said layer is formed by vacuum evaporation.

7. A catalyst as set forth in claim 1, wherein:
   at least one said layer is formed by ion plating.

8. A catalyst as set forth in claim 1, wherein:
   at least one said layer is formed by sputtering.

9. A palladium plated catalyst having high hydrogen adsorption capabilities comprising:
   a plurality of conductive microspheres each of substantially uniform diameter and having layers of copper, then a first nickel layer atop said copper layer, then a palladium layer atop said first nickel layer, then a second nickel layer atop said palladium layer, each said layer of uniform thickness;
   said palladium layer capable of absorbing large quantities of hydrogen through said second nickel layer.

10. A catalyst as set forth in claim 9, wherein:
    each said microsphere has a non-conductive core formed of cross-linked polystyrene.

11. A catalyst as set forth in claim 9, wherein:
    at least one said layer is formed by electroplating.

12. A catalyst as set forth in claim 9, wherein:
    at least one said layer is formed by immersion plating.

13. A catalyst as set forth in claim 9, wherein:
    at least one said layer is formed by electroless plating.

14. A catalyst as set forth in claim 9, wherein:
    at least one said layer is formed by vacuum evaporation.

15. A catalyst as set forth in claim 9, wherein:
    at least one said layer is formed by ion plating.

16. A catalyst as set forth in claim 9, wherein:
    at least one said layer is formed by sputtering.

17. A catalyst comprising:
    a plurality of uniform non-conductive cores each having a conductive metal flash coating of uniform thickness formed by chemical combination with a cation exchange surface of said non-conductive cores from a metal cation which will chemically reduce with hydrazene;
    a nickel layer of uniform thickness formed atop said flash coating;
    a metallic hydride forming layer of uniform thickness formed atop said nickel layer, said metallic hydride forming layer being readily combinable with hydrogen or an isotope of hydrogen;
    a metallic support layer of uniform thickness formed atop said metallic hydride forming layer.

18. A catalyst as set forth in claim 17, further comprising:
    a metallic stabilizing layer of uniform thickness formed atop said metallic support layer, said metallic stabilizing layer being a transition metal.

19. A catalyst as set forth in claim 17, wherein:
    said flash coating has a thickness in the range of 1 to 10 angstroms;
    said nickel layer and said metallic support layer each have a thickness in the range of about 10 angstroms to 1 micron;
    said metallic hydride forming layer has a thickness in the range of about 10 angstroms to 2 microns.

20. A catalyst as set forth in claim 18, wherein:
    said flash coating has a thickness in the range of 1 to 10 angstroms;
    said nickel layer and said metallic support layer each have a thickness in the range of about 10 angstroms to 1 micron;
    said metallic hydride forming layer has a thickness in the range of about 10 angstroms to 2 microns;
    said metallic stabilizing layer has a thickness in the range of about 1 to 60 angstroms.

21. A catalyst as set forth in claim 17, wherein said flash coating is taken from the group consisting of:
    copper, palladium, nickel and titanium.

22. A catalyst as set forth in claim 17, wherein said metallic hydride forming layer is taken form the group consisting of:
    palladium, lanthanum, praseodymium, cerium, titanium, zirconium, vanadium, tantalum, uranium, hafnium and thorium.

23. A catalyst as set forth in claim 17, wherein said metallic support layer is taken from the group consisting of:
    nickel, gold, silver and titanium.

24. A catalyst as set forth in claim 19, wherein said metallic stabilizing layer is taken from the group consisting of:
    chromium, iron, cobalt end nickel.

25. A catalyst as set forth in claim 19, wherein:

said flash coating is taken from the group consisting of: copper, palladium, nickel and titanium;

said metallic hydride forming layer is taken from the group consisting of:
palladium, lanthanum, praseodymium, cerium, titanium, zirconium, vanadium, tantalum. uranium, hafnium and thorium;

said metallic support layer is taken from the group consisting of:
nickel, gold, silver and titanium; and said metallic stabilizer layer is taken from the group consisting of:
chromium, iron, cobalt and nickel.

\* \* \* \* \*